Sept. 15, 1931.   D. L. MITCHELL   1,823,622
ACCELERATOR OPERATING MEANS
Filed Jan. 29, 1930
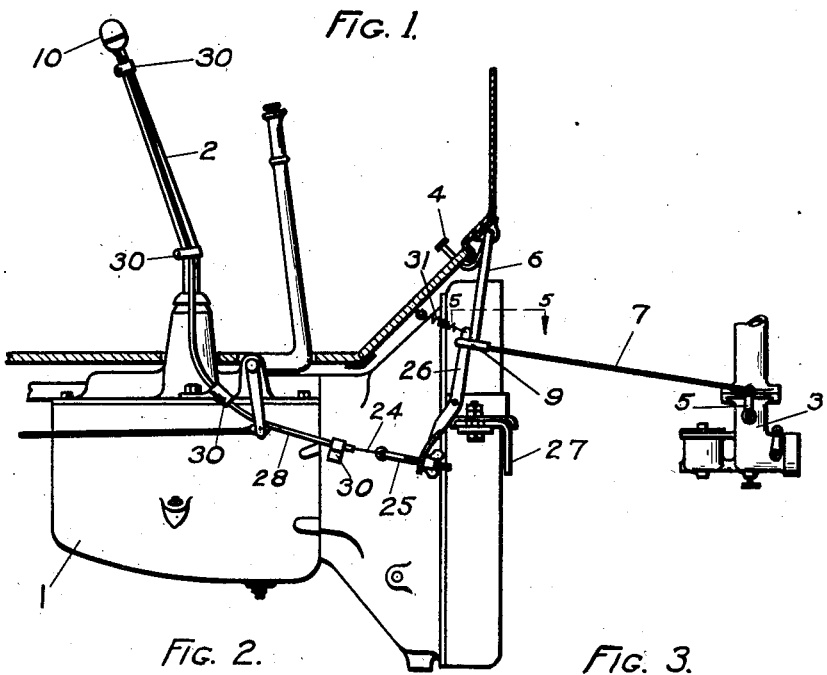
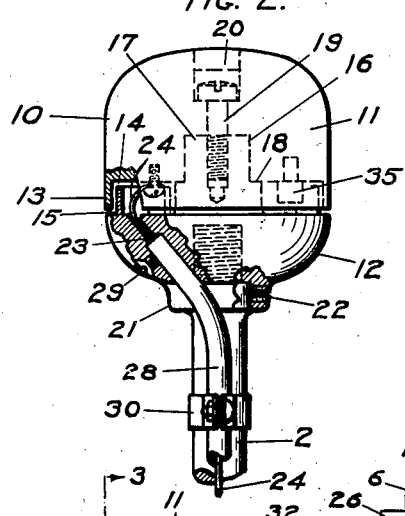
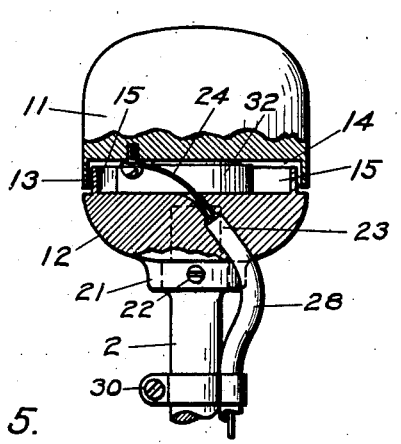
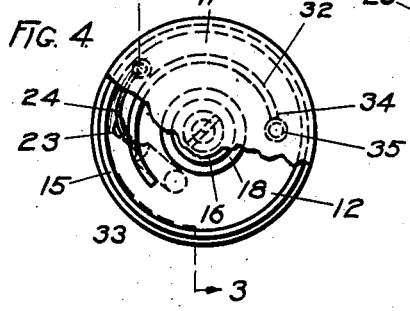
Inventor
DONALD L. MITCHELL
By Owen H. Spencer
Attorney Patented Sept. 15, 1931

1,823,622

UNITED STATES PATENT OFFICE

DONALD L. MITCHELL, OF INDIANAPOLIS, INDIANA

ACCELERATOR OPERATING MEANS

Application filed January 29, 1930. Serial No. 424,228.

This invention relates to accelerator attachments for vehicle motors and particularly to that class having a gear shift lever and one feature of the invention is the provision of means for manually operating the accelerator and without interfering with the foot operating means for the accelerator.

A further feature of the invention is in mounting the manually operated means in connection with the gear shifting lever in a manner that the accelerator may be operated without interfering with the operation of such lever.

A further feature of the invention is the provision of means for connecting the manually operated mechanism with the foot operating mechanism and in a manner that the foot controlled parts may be operated without interfering with the hand operated parts.

A further feature of the invention is in so constructing and arranging the hand operating portion of the device that it will form a part of the gear shifting lever.

Other objects and advantages will be hereinafter more fully set forth and pointed out in the accompanying specification.

In the accompanying drawings which are made a part of this application,

Figure 1 is a diagrammatic elevation of parts of a motor propelled vehicle with my improved accelerator attached thereto.

Figure 2 is an enlarged detail elevation of a part of a gear shift lever, with parts broken out.

Figure 3 is a similar view at a different angle, with parts broken away, as along line 3—3, Fig. 4.

Figure 4 is a top plan view of the gear shifting lever, with parts broken out, and, Figure 5 is a sectional view as seen along line 5—5, Fig. 1.

Referring to the drawings, the numeral 1 designates the gear case of an internal combustion engine, which may be of any preferred structure and 2 indicates a lever employed for shifting the gears (not shown) within the gear case 1, the parts herein shown being that of a model A Ford automobile.

In this form of vehicle, the carburetor 3 is operated for accelerating the same by means of a foot operated mechanism 4, which is connected to the valve operating lever 5 of the carbureter by means of a crank arm 6 and a rod 7, the lower end of the crank arm 6 having a laterally extending shank 8, to which the rod 7 is connected, the free end of the shank 8 having a rearwardly extending finger 9, making the shank substantially L-shaped.

A great deal of difficulty has been encountered in releasing the foot from the foot brake pedal to apply pressure to the accelerator pedal, especially in dense traffic or when the vehicle is resting on an incline and to overcome this objectionable feature and make it possible for the operator to retain his foot on the brake pedal at critical times, means are herein shown for manually operating the accelerator from the gear shift lever 2.

To this end a special knob 10 is attached to the upper end of the gear shift lever 2, which is formed in an upper and lower section 11 and 12, the lower face of the section 11 having a circumferential flange 13, forming a cavity 14, into which extends a flange 15 on the upper face of the lower section 12, the flange 15 fitting within the flange 13. At the axial center of the lower face of the upper section 11 is formed a socket 16 into which extends a stud 17, projecting upwardly from the axial center of the section 12, the stud 17 having a shoulder 18, against which the face of the section 11 rests, thus holding the two sections in proper spaced relation. The two sections 11 and 12 are held in cooperative relation with each other by means of a screw 19, or other suitable means, which passes downwardly through a bore 20 in the section 11 and threads into the section 12 in such manner that the section 11 will have free rotating movement around the stud 17. The section 12 may be attached to the end of the lever 2 by threading the same onto the lever or entering the end of the lever into a socket 21 and securing the same therein in any suitable manner, as by means of a set screw 22.

Formed in an angular direction through the lower section 12, is an opening 23, through which passes a controlling wire 24, the upper end of which is attached to the under face of the section 11, while the opposite end thereof is attached to an adjusting mechanism 25, which is in turn attached to an operating lever 26, pivotally mounted on parts of the frame 27, of the vehicle. The wire 24 preferably extends through a flexible tube 28, the upper end of which is preferably entered in the lower end of the opening 23 and held therein by means of a binding screw 29, said tube being passed through suitable anchoring clips 30, disposed at intervals throughout the length of the tube, certain of said clips being carried by the lever 2 and others attached to suitable parts of the vehicle. As shown, the wire and flexible tube are mounted exteriorly of the lever 2, but in the event the lever 2 is hollow, the wire and tube may be extended for a distance through the lever.

The upper end of the operating lever 26 rests in the path of the laterally extending shank 8 of the crank arm 6, so that it will pass between the crank arm 6 and the finger 9, said crank arm and finger holding the lever 26 in proper alinement at all times, the upper end of the lever 26 normally resting in slight spaced relation with the shank 8, so that the throw of the lever 26 may be regulated through the medium of the adjusting mechanism 25. A tension spring 31 is extended from parts of the vehicle to the upper end of the lever 26, for returning and holding the lever 26 in its retracted position.

The trend of the wire 24 through the lower secton 12 and through the cavity 14, of the section 11, is substantially spirally to the axis of the knob 10, so that when the section 11 is rotated no abrupt bends or binding points will be formed in the wire, the end of the opening 23 entering the cavity 14 being flared to remove all sharp edges and permitting the wire to freely move lengthwise in either direction without binding.

The wire 24 is further retained in substantially spiral formation by means of a circular wall 32, extending upwardly from the face of the section 12, the ends 33 and 34 forming stops for a pin 35 carried by the member 11, thus limiting the rotating movement of the member 11 in each direction.

In operating the present device, the motor may be accelerated by hand, by grasping the knob 10 and rotating the member 11 to the right, thus directing a longitudinal pull on the wire 24 and swinging the top end of the operating lever 26 forwardly and against the shank 8, a continued pull on the wire causing the lever 26 to move the rod 7 lengthwise and open the valve in the carbureter and admit a greater volume of gaseous mixture. When the carburetor valve has been opened to its full extent, the pin 35 will strike against the end 33 of the wall 32 and prevent further rotation of the member 11. As soon as the rotating action is released from the member 11, the spring 31 will instantly swing the upper end of the lever 26 away from the shank 8 and permit the carbureter valve to close and also rotate the member 11 until the pin 35 again strikes the end 34 of the wall 32.

This operation can be performed either during the shifting of the lever 2 or while the lever is standing stationary and independently of the foot operating mechanism 4, so that the driver may use his foot exclusively for operating the brake mechanism of the vehicle, this being especially advantageous when in congested traffic or on an incline, such as a steep grade or mountain road, where it is necessary to accelerate while the brake is still in operation to hold the car, or on the instant the brake mechanism starts to release.

While I have shown this device attached to a model A Ford automobile, it will be understood that with slight variations in attachments, it may be attached to any make of car using a gear shift lever, and by properly adjusting the mechanism 25 with respect to the operating lever, the shifting of the gear shifting lever to various position, will not effect the proper operation of the accelerator operating mechanism.

While the description and drawings illustrate in a general way certain instrumentalities which may be employed in carrying the invention into effect, it is evident that many modifications may be made in the various details without departing from the scope of the appended claims, it being understood that the invention is not restricted to the particular examples herein described.

What I claim is:

1. The combination with a foot operated accelerating mechanism and a gear shift lever, of a knob attached to said lever, said knob comprising a stationary member and a rotatable member connected therewith, said stationary member having an opening therethrough, a wire extending through said opening and being attached to the rotatable member, said opening being constructed to prevent binding of the wire against any parts thereof, and means to which the opposite end of said wire is connected adapted to operate the accelerator mechanism without applying pressure on the foot operating mechanism when a lengthwise pull is made on said wire.

2. The combination with a foot operated accelerator and a gear shift lever, of a pivotally mounted operating lever adapted to be contacted with portions of said foot operating mechanism for operating the accelerator, a knob having a stationary part and a rotatable part, a wire attached at one end to said movable portion of the knob and at its opposite end to said operating lever, and means for limiting the rotation of said rotatable portion of said knob.

3. The combination with an accelerator for a carbureter adapted to receive pressure from the foot for operating the same, and a gear shift lever, of means extending from said gear shift lever for manually operating said accelerator, comprising a two part knob attached to said gear shift lever, one member of the knob being fixed to said lever and the other member rotatably attached to the fixed member, overlapping flanges on the meeting faces of said sections forming a cavity, a wall extending upwardly from said fixed section, a pin depending from the rotatable member, the ends of said wall forming stops for said pin, and a lever operating wire extending through said fixed section and attached to said rotatable member adapted to be moved lengthwise when the rotatable member is rotated.

4. The combination with a foot operated accelerating mechanism and a gear shift lever, of a knob attached to said lever, said knob comprising a stationary member and a rotatable member connected therewith, said stationary member having an opening therethrough, a wire extending through said opening and being attached directly to said rotatable member, and means to which the opposite end of said wire is attached adapted to operate the accelerator mechanism without applying pressure on the foot operating mechanism when a lengthwise pull is made on said wire and permit operation of the accelerating means with the foot without imparting action to said knob and parts connected therewith.

In testimony whereof, I have hereunto set my hand on this 18th day of January, 1930.

DONALD L. MITCHELL.